Feb. 27, 1923.
R. HUNZIKER
TRUCK
Filed Mar. 25, 1919
1,446,799
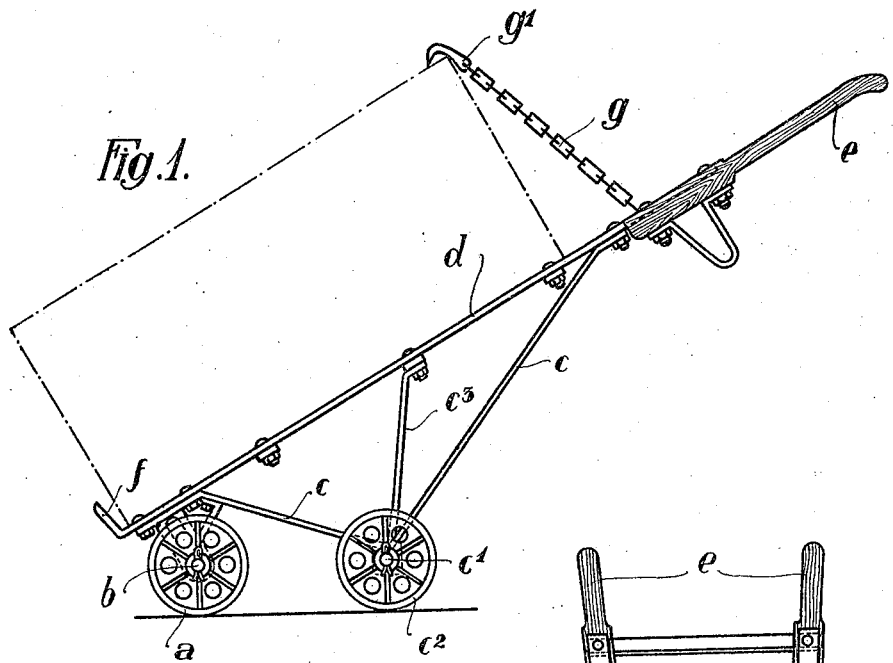
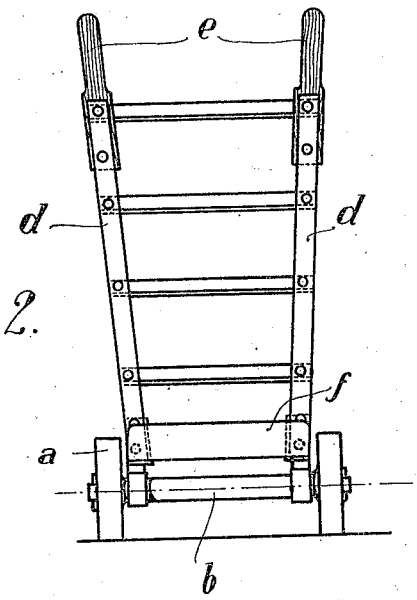
Inventor.
R. Hunziker
By H. R. Kerslake
Atty.

Patented Feb. 27, 1923.

1,446,799

UNITED STATES PATENT OFFICE.

RUDOLF HUNZIKER, OF ST.-AUBIN, SWITZERLAND.

TRUCK.

Application filed March 25, 1919. Serial No. 285,067.

*To all whom it may concern:*

Be it known that I, RUDOLF HUNZIKER, citizen of the Swiss Republic, residing at Saint-Aubin, Canton of Neuchatel, Switzerland, have invented a new and useful Truck; and I do hereby declare the following to be a full, clear, and exact description of the same.

This invention relates to improvements in combined wagons and trucks and the object of the invention is to provide a vehicle having a platform which may be moved into substantially vertical position for receiving an article such as a box or trunk and which may be then swung into a horizontal position for the purpose of transferring the article.

Another object of the invention is to provide an improved truck on which a load may be transported without placing any weight on the operator.

A further object of the invention is to provide a four-wheeled truck in which the front and rear wheels are arranged sufficiently close together to permit the truck and the load which it supports to be arranged on the platform of a small platform scale.

A still further object of the invention is to furnish an improved truck having a rear wheel arranged close to the front wheels but spaced a greater distance from the platform of the truck so that the platform may be swung about said rear wheels when it is desired to raise the front end of the truck in clearing an obstruction or climbing a stairway.

Another object of the invention is to provide a combined vehicle of the above character with means adapted to engage the article to facilitate holding of the same on the vehicle.

With the foregoing objects outlined and with other objects in view which will appear as the description proceeds the invention consists in the novel features hereinafter described in detail, illustrated in the accompanying drawings and more particularly pointed out in the appended claims.

Referring to the drawings:—

Fig. 1 is a side view of the improved vehicle showing in dotted lines an article carried by the same.

Fig. 2 is a front view of the vehicle.

In the drawings $a$ designates the front wheels of the vehicle which are mounted on an axle $b$ that is arranged near one end of the platform $d$ and is located sufficiently close to the platform to permit the platform to be swung into vertical position for the purpose of inserting the horn or ledge F beneath the article which is to be transferred.

Extending from the platform are two depending brackets or braces $c$ arranged substantially at right angles to each other and carrying at their lower ends an axle $c'$ having upon its ends wheels $c^2$ of the same diameter as the wheels $a$. A third brace rod $c^3$ extends from the axle $c'$ to the platform $d$ and functions to brace the axle. It will be seen that the upper ends of the brackets $c$ and $c^3$ are rigidly connected to the platform $d$. The wheels $c^2$ are arranged close to the wheels $a$ so that the truck may be readily mounted on a platform of a small platform scale for the purpose of weighing the articles carried by the truck.

It will be noted that the braces $c$ and $c^3$ place the axle of the wheels $c^2$ at a greater distance from the platform than the axle $b$ and that the axle $c$ is arranged beneath an intermediate portion of the platform so that the wheels $c^2$ will act as a fulcrum about which the platform may be swung to bring said platform into a horizontal position to facilitate climbing a stairway with a truck in loaded condition.

The platform is provided with end handles $e$, and a cable or a chain $g$ has one of its ends secured to the platform and its other end provided with a hook or dog $g'$.

In operation the vehicle is adapted to be moved into a position adjacent to the article to be transferred, then the platform is placed in vertical position and the horn F is inserted beneath one of the lower edges of the article to be carried. Then the chain or cable $g$ is placed over the article and the hook or dog is placed on the opposite upper edge of the article. Then when the platform is swung away from the article to bring the wheels $c^2$ into contact with the surface on which the truck rests, the article will be moved into the position shown in Fig. 1. The truck may then be rolled along on the wheels $a$ and $c$ and the operator will be relieved of any weight. The platform may, when necessary, be swung into horizontal position and the article supported on the wheels $c^2$ for the purpose of climbing a stairway with the truck.

The arrangement of the wheels in the present construction will permit the truck to be raised for the purpose of traveling over uneven surfaces such as stairways and the like.

While I have showed the preferred embodiment of my invention, I am aware that various changes may be made in the construction illustrated without departing from the spirit of the invention as disclosed in the following claims.

What I claim and desire to secure by Letters Patent is:—

A vehicle comprising a substantially straight platform provided at one end with a horn and at its other end with handles, an axle arranged transversely beneath the front portion of said platform and being located in close proximity to said platform, wheels mounted upon said axle, a plurality of braces extending from an intermediate portion of said platform, having their upper ends rigidly connected to said platform, and arranged substantially at right angles to one another, a second axle connected to the lower ends of said braces and arranged a greater distance from the platform than the other axle, wheels mounted upon the second axle and arranged in close proximity to the first mentioned wheels.

In testimony whereof, I have signed my name to this specification.

RUDOLF HUNZIKER.